(12) United States Patent
Tubert et al.

(10) Patent No.: US 8,878,903 B2
(45) Date of Patent: Nov. 4, 2014

(54) METHOD AND DEVICE FOR RECONSTRUCTION OF A THREE-DIMENSIONAL IMAGE FROM TWO-DIMENSIONAL IMAGES

(75) Inventors: Cédric Tubert, Grenoble (FR); Jérôme Vaillant, Grenoble (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 449 days.

(21) Appl. No.: 13/273,057

(22) Filed: Oct. 13, 2011

(65) Prior Publication Data
US 2012/0092459 A1 Apr. 19, 2012

(30) Foreign Application Priority Data

Oct. 13, 2010 (FR) .................................. 10 04028

(51) Int. Cl.
H04N 13/02 (2006.01)
G06T 7/00 (2006.01)

(52) U.S. Cl.
CPC .................................. G06T 7/0073 (2013.01)
USPC ............ 348/46; 348/362; 348/135; 348/348; 348/371; 348/294; 382/154; 382/106; 702/152; 356/614; 356/622; 356/3; 356/4.07

(58) Field of Classification Search
CPC .................................................... G06T 7/0073
USPC .................. 348/46, 362, 135, 348, 371, 294; 382/54, 106; 702/152; 356/614, 622, 3, 356/4.07
See application file for complete search history.

(56) References Cited

U.S. PATENT DOCUMENTS

| 6,538,751 | B2 * | 3/2003 | Ono ................................ 356/614 |
| 6,686,921 | B1 * | 2/2004 | Rushmeier et al. ........... 345/589 |
| 6,704,447 | B2 * | 3/2004 | Sukthankar et al. .......... 382/170 |
| 8,073,318 | B2 * | 12/2011 | Gindele et al. .................. 396/98 |
| 2008/0137101 | A1 * | 6/2008 | Spence et al. ................. 356/611 |

FOREIGN PATENT DOCUMENTS

| EP | 1 102 211 A2 | 5/2001 |
| EP | 1 126 412 A2 | 8/2001 |
| WO | WO 2009018858 A1 * | 2/2009 |

OTHER PUBLICATIONS

Durou et al., "Numerical methods for shape-from-shading: A new survey with benchmarks," *Computer Vision and Image Understanding*, 109(1): 22-43, 2008.
Horn et al., "Determining Shape and Reflectance Using Multiple Images," Massachusetts Institute of Technology Artificial Intelligence Laboratory, A.I. Memo 490, Aug. 1978, 9 pages.

(Continued)

*Primary Examiner* — Behrooz Senfi
*Assistant Examiner* — Maria Vazquez Colon
(74) *Attorney, Agent, or Firm* — Seed IP Law Group PLLC

(57) ABSTRACT

The disclosure relates to a method for reconstruction of a three-dimensional image of an object. A first image is acquired of the object lit by a luminous flux having, in a region including the object, a luminous intensity dependant on the distance, with a light source emitting the luminous flux. A second image is acquired of the object lit by a luminous flux having, in a region including the object, a constant luminous intensity. For each pixel of a three-dimensional image, a relative distance of a point of the object is determined as a function of the intensity of a pixel corresponding to the point of the object in each of the acquired images.

30 Claims, 2 Drawing Sheets

(56) References Cited

OTHER PUBLICATIONS

Langer et al., "Diffuse Shading, Visibility Fields, and the Geometry of Ambient Light," Research Center for Intelligent Machines, McGill University, pp. 138-147, 1993.

Zhang et al., "Shape from Shading: A Survey," *IEEE Transactions on Pattern Analysis and Machine Intelligence*, 21(8): 690-706, Aug. 1999.

* cited by examiner

METHOD AND DEVICE FOR RECONSTRUCTION OF A THREE-DIMENSIONAL IMAGE FROM TWO-DIMENSIONAL IMAGES

BACKGROUND

1. Technical Field

The present disclosure relates to the production of three-dimensional images, and to a method for reconstruction of the three-dimensions of an object from two-dimensional images. The present disclosure relates for example, but not exclusively, to the recognition of faces or fingerprints, robotics, microscopy, surface analysis, etc.

2. Description of the Related Art

Numerous methods of reconstructing images in three dimensions exist. Stereoscopic vision is one of the most well-known methods of three-dimensional vision. This method is based on the use of several images of an object taken from different angles, and uses extensive calculations in order to establish the correspondences between the different images. Despite advances in the calculation power of graphic processors specialized in stereoscopic vision, this method does not seem to be compatible with real-time applications, in particular for the reconstruction at a video rate of three-dimensional images, and for applications using high-resolution images. However, graphic processors capable of implementing this method exist, but their cost is incompatible with general public applications. Moreover, this method offers a limited precision as far as depth calculation is concerned.

Methods also exist consisting of acquiring several images of an immobile object from a single point of view with different focuses, to determine a depth for each pixel of the images as a function of the sharpness of the object near the pixel in each image. These methods use a high number of images and are therefore not adapted to real-time applications.

It is also known to use Time-Of-Flight (TOF) camera systems. These systems use the intervention of "LIDAR" techniques (LIght Detection And Ranging), but offer the advantage of supplying all the pixels of an image of a scene at the same time. These systems are be equipped with ultra-rapid and therefore very sensitive sensors, an ultra-rapid pulsed light source of the laser or electroluminescent diode type, a lens, and, optionally, a very selective filter. In order to reduce measurement noise, these systems calculate an average over several images. These systems are thus very costly, and supply low-resolution images.

Other systems implementing interferometric techniques are reserved for scientific and medical applications due to their very high cost, their complex implementation, and the range of measurable distances (microns).

BRIEF SUMMARY

At least some embodiments relate to a method for reconstruction of a three-dimensional image of an object, comprising a step of acquiring at least an image of an object, wherein the method further comprises steps of: acquiring a first image of the object lit by a luminous flux having, in a region including the object, a luminous intensity dependant on the distance with a light source emitting the luminous flux; acquiring a second image of the object lit by a luminous flux having, in a region including the object, a constant luminous intensity; and evaluating for each pixel of a three-dimensional image, a relative distance of a point of the object as a function of the intensity of a pixel corresponding to the point of the object in each of the acquired images.

According to one embodiment, the object is lit by a same light source producing a divergent light beam during the acquisition of the first image, and a collimated beam during the acquisition of the second image.

According to one embodiment, each pixel of the three-dimensional image is evaluated with the aid of the following equation:

$$D(P) = \sqrt{\frac{I3(P)}{I2(P)}}$$

wherein $D(P)$ represents a pixel of the three-dimensional image, corresponding to a point P of the object, and $I2(P)$ and $I3(P)$ represent the intensity of the pixel corresponding to the point P of the object, respectively in the first and second images.

According to one embodiment, the method comprises a step of acquiring a third image of the object lit only by an ambient light.

According to one embodiment, each pixel of the three-dimensional image is evaluated with the aid of the following equation:

$$D(P) = \sqrt{\frac{I3(P) - I1(P)}{I2(P) - I1(P)}}$$

wherein $D(P)$ represents a pixel of the three-dimensional image corresponding to a point P of the object, and $I1(P)$, $I2(P)$, and $I3(P)$ represent the intensity of the pixel corresponding to the point P of the object, respectively in the third, first and second images.

According to one embodiment, the object is lit by a light source producing a divergent light beam during the acquisition of the first image, and lit by an ambient light with parallel or completely diffused rays during the acquisition of the second image.

According to one embodiment, each pixel of the three-dimensional image is evaluated with the aid of the following equation:

$$D(P) = \sqrt{\frac{I1(P)}{I2(P) - I1(P)}}$$

wherein $D(P)$ represents a pixel of the three-dimensional image, corresponding to a point P of the object, and $I1(P)$ and $I2(P)$ represent the intensity of the pixel corresponding to the point P of the object, respectively in the second and first images.

According to one embodiment, the acquired images are in color and comprise an image component for each of several complementary colors, the method comprising steps of calculating the intensity of pixels of each image by adding pixel-by-pixel the image components of each complementary color of the image.

According to one embodiment, the acquired images are in color and comprise an image component for each complementary color, the method comprising steps of determining a three-dimensional image of the object for each complementary color by evaluating, for each pixel of each three-dimensional image, a relative distance as a function of the intensity of a corresponding pixel in each of the image components of a same complementary color, of acquired images, and of combination of images in three dimensions determined for each complementary color component, to form a three-dimensional image.

According to one embodiment, the combination of images in three dimensions determined for each complementary color component, is done by calculating, for each pixel and each complementary color, sums of luminous intensities of corresponding pixels in each of the image components of the complementary color, of acquired images, and by calculating an average for each pixel of the three-dimensional image, of each corresponding pixel of three-dimensional images determined for each complementary color component, weighted by the calculated sums.

According to one embodiment, the method comprises a step of correcting the value of each pixel of the obtained three-dimensional image by applying to the value of the pixel an n-degree polynomial of which the coefficients are determined during a calibration step on a calibration bench.

According to one embodiment, the polynomial is of degree 2 or 3.

At least some embodiments relate to a processing device configured to implement the method according to one of the embodiments disclosed above.

At least some embodiments relate to a non-transitory computer-readable medium storing a program comprising instructions for the execution of the method according to one of the embodiments disclosed above, when the program is executed by a computer.

At least some embodiments relate to a system for reconstruction of a three-dimensional image of an object, comprising an image capture device, a light source, and a processing device receiving images acquired by the image capture device, wherein the processing device is configured to implement the method according to one of the embodiments disclosed above.

According to one embodiment, the light source is associated with a lens controlled to form a light beam that is either divergent or with parallel rays.

At least some embodiments relate to an image capture device, comprising an image sensor associated with an optical lens, supplying images of a scene, and a light source to light the scene, wherein the light source is associated with a lens controlled to form a light beam that is either divergent or with parallel rays, the image capture device being configured to supply successive image sequences, each comprising an image taken with the controlled lens to form a divergent light beam and an image taken with the controlled lens to form a light beam with parallel rays.

According to one embodiment, the device is configured so that each image sequence supplied comprises an image taken with the light source turned off.

In an embodiment, a method comprises: acquiring a first image of an object lit by a luminous flux having, in a region including the object, a luminous intensity dependant on a distance of a light source emitting the luminous flux; acquiring a second image of the object lit by a luminous flux having, in a region including the object, a constant luminous intensity; and determining for pixels of a set of pixels of a three-dimensional image, a relative distance of a point of the object as a function of an intensity of a pixel corresponding to the point of the object in the first and second acquired images. In an embodiment, the object is lit by a same light source producing a divergent light beam during the acquisition of the first image, and a collimated beam during the acquisition of the second image. In an embodiment, the relative distance of each pixel of the set of pixels of the three-dimensional image is determined based on the following equation:

$$D(P) = \sqrt{\frac{I3(P)}{I2(P)}}$$

wherein D(P) represents a pixel of the three-dimensional image, corresponding to a point P of the object, and I2(P) and I3(P) represent the intensity of the pixel corresponding to the point P of the object, respectively in the first and second images. In an embodiment, the method comprises acquiring a third image of the object lit only by an ambient light, wherein the function is a function of an intensity of the pixel corresponding to the point of the object in the first, second and third acquired images. In an embodiment, the relative distance of each pixel of the set of pixels of the three-dimensional image is determined based on the following equation:

$$D(P) = \sqrt{\frac{I3(P) - I1(P)}{I2(P) - I1(P)}}$$

wherein D(P) represents a pixel of the three-dimensional image corresponding to a point P of the object, and I1(P), I2(P), and I3(P) represent the intensity of the pixel corresponding to the point P of the object, respectively in the third, first and second images. In an embodiment, the object is lit by a light source producing a divergent light beam during the acquisition of the first image, and lit by an ambient light with parallel or completely diffused rays during the acquisition of the second image. In an embodiment, the relative distance of each pixel of the set of pixels of the three-dimensional image is determined based on the following equation:

$$D(P) = \sqrt{\frac{I1(P)}{I2(P) - I1(P)}}$$

wherein D(P) represents a pixel of the three-dimensional image, corresponding to a point P of the object, and I1(P) and I2(P) represent the intensity of the pixel corresponding to the point P of the object, respectively in the second and first images. In an embodiment, the acquired images are in color and comprise an image component for each of several complementary colors, the method comprising calculating the intensity of pixels of an image by adding pixel-by-pixel the image components of each complementary color of the image. In an embodiment, the acquired images are in color and comprise an image component for each of several complementary colors, and the determining comprises: for each complimentary color, determining a relative distance as a function of the intensity of a corresponding pixel of the complementary color in each acquired image, producing an image in three dimensions in the complementary color; and combining the produced images in three dimensions to produce the three-dimensional image. In an embodiment, combining the produced images in three dimensions comprises: for each pixel in each produced image in three dimensions, determining a weighting factor for the pixel; and applying the weighting factor to the pixel; and adding the weighted pixels of the produced images in three dimensions. In an embodiment, combining the produced images in three dimensions comprises: calculating, for each pixel and each complementary color, sums of luminous intensities of corresponding pixels in each of the image components of the complementary color, of acquired images; and calculating an average for each pixel of the three-dimensional image, of each corresponding pixel of three-dimensional images determined for each complementary color component, weighted by the calculated sums. In an embodiment, the method comprises correcting a value of each pixel of the three-dimensional image by applying to the value of the pixel an n-degree polynomial having calibration coefficients. In an embodiment, the polynomial is of degree 2 or 3.

In an embodiment, a non-transitory computer-readable medium's contents cause an image processing device to perform a method, the method comprising: acquiring a first image of an object lit by a luminous flux having, in a region including the object, a luminous intensity dependant on a distance of a light source emitting the luminous flux; acquiring a second image of the object lit by a luminous flux having, in a region including the object, a constant luminous intensity; and determining for pixels of a set of pixels of a three-dimensional image, a relative distance of a point of the object as a function of an intensity of a pixel corresponding to the point of the object in the first and second acquired images. In an embodiment, the method further comprises controlling a light source to produce a divergent light beam during the acquisition of the first image, and a collimated beam during the acquisition of the second image. In an embodiment, the relative distance of each pixel of the set of pixels of the three-dimensional image is determined based on the following equation:

$$D(P) = \sqrt{\frac{I3(P)}{I2(P)}}$$

wherein D(P) represents a pixel of the three-dimensional image, corresponding to a point P of the object, and I2(P) and I3(P) represent the intensity of the pixel corresponding to the point P of the object, respectively in the first and second images. In an embodiment, the acquired images are in color and comprise an image component for each of several complementary colors, the method comprising calculating the intensity of pixels of an image by adding pixel-by-pixel the image components of each complementary color of the image. In an embodiment, the acquired images are in color and comprise an image component for each of several complementary colors, and the determining comprises: for each complimentary color, determining a relative distance as a function of the intensity of a corresponding pixel of the complementary color in each acquired image, producing an image in three dimensions in the complementary color; and combining the produced images in three dimensions to produce the three-dimensional image. In an embodiment, combining the produced images in three dimensions comprises: for each pixel in each produced image in three dimensions, determining a weighting factor for the pixel; and applying the weighting factor to the pixel; and adding the weighted pixels of the produced images in three dimensions. In an embodiment, the method comprises correcting a value of each pixel of the three-dimensional image.

In an embodiment, an image processing device comprises: one or more inputs configured to receive: an first image of an object lit by a luminous flux having, in a region including the object, a luminous intensity dependant on a distance of a light source emitting the luminous flux; and a second image of the object lit by a luminous flux having, in a region including the object, a constant luminous intensity; and one or more processing modules coupled to the one or more inputs and configured to determine for pixels of a set of pixels of a three-dimensional image, a relative distance of a point of the object as a function of an intensity of a pixel corresponding to the point of the object in the first and second images. In an embodiment, the device further comprises: an image capture device coupled to the one or more inputs and configured to capture the first and second images; and a light source having a lens, wherein the device is configured to control the lens to form a divergent light beam during capture of the first image by the image capture device and to form a collimated light beam during capture of the second image by the image capture device. In an embodiment, the one of more processing modules is configured to determine the relative distance of each pixel of the set of pixels of the three-dimensional image based on the following equation:

$$D(P) = \sqrt{\frac{I3(P)}{I2(P)}}$$

wherein D(P) represents a pixel of the three-dimensional image, corresponding to a point P of the object, and I2(P) and I3(P) represent the intensity of the pixel corresponding to the point P of the object, respectively in the first and second images. In an embodiment, the image capture device is configured to capture a third image of the object lit only by an ambient light and the function is a function of an intensity of the pixel corresponding to the point of the object in the first, second and third images. In an embodiment, the relative distance of each pixel of the set of pixels of the three-dimensional image is determined based on the following equation:

$$D(P) = \sqrt{\frac{I3(P) - I1(P)}{I2(P) - I1(P)}}$$

wherein D(P) represents a pixel of the three-dimensional image corresponding to a point P of the object, and I1(P), I2(P), and I3(P) represent the intensity of the pixel corresponding to the point P of the object, respectively in the third, first and second images. In an embodiment, the image capture device is configured to capture color images and the one or more processing modules is configured to process color images.

In an embodiment, a system comprises: means for receiving, a first image of an object lit by a luminous flux having, in a region including the object, a luminous intensity dependant on a distance of a light source emitting the luminous flux; and a second image of the object lit by a luminous flux having, in a region including the object, a constant luminous intensity; and means for determining, for pixels of a set of pixels of a three-dimensional image, a relative distance of a point of the object as a function of an intensity of a pixel corresponding to the point of the object in the first and second images. In an embodiment, the means for determining comprises a three-dimensional image construction module configured to construct a three dimensional image from at least the first and second images. In an embodiment, the means for determining comprises a shape recognition module and a correction module. In a embodiment, the means for determining comprises at least one adder and a plurality of multipliers.

At least some embodiments provide a relatively low cost system, capable of supplying in real-time an absolute or relative depth map of a scene with a high resolution.

BRIEF DESCRIPTION OF THE SEVERAL VIEWS OF THE DRAWINGS

Embodiment examples will be described in the following, in a non-limiting manner in relation with the appended drawings among which.

DETAILED DESCRIPTION

Figure 1A:
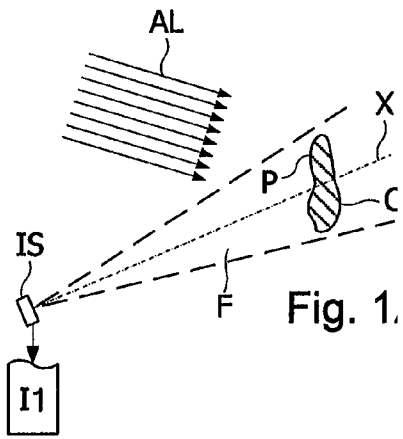
FIGS. 1A, 1B, 1C schematically show three acquisition modes of an image of an object, adapted to the implementation of a reconstruction method of a three-dimensional image, according to one embodiment, FIG. 2 schematically shows a device for reconstructing in three-dimensions an object from two-dimensional images of luminous intensity, according to one embodiment, FIGS. 3 to 5 schematically show a circuit of combination of acquired images from the circuit of FIG. 2, according to various embodiments, FIG. 6 schematically shows an embodiment of a circuit of the device of FIG. 2.
Figure 1B:
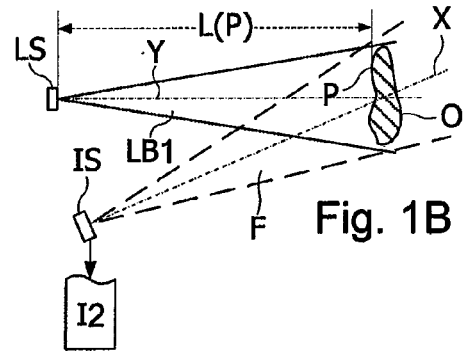
Figure 1C:
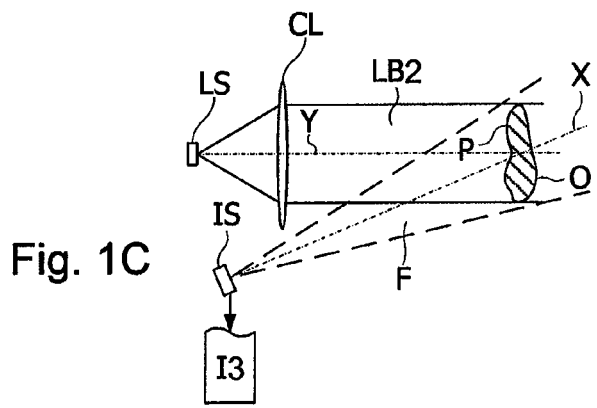

FIGS. 1A, 1B, 1C schematically show three acquisition modes of an image of an object O. In FIGS. 1A, 1B, 1C, object O is maintained fixed in the field F of an image capture device IS conventionally comprising an image sensor associated with an optical lens. In FIG. 1A, the image capture device IS supplies an image I1 of object O lit only by an ambient light AL. The light AL is for example produced by the sun or an interior lighting. In certain cases, the intensity of this light may be considered as uniform, that is to say constant for every point lit by the light or independent of the distance between the light source and the point considered.

In FIG. 1B, object O is lit by a light source LS emitting a divergent light beam LB1. The device IS supplies an image I2 of object O. In these lighting conditions, the intensity I2(P,λ) at a wavelength λ of a pixel of image I2 corresponding to a point P of object O, may be simulated by the following equation:

$$I2(P, \lambda) = \alpha(P, \lambda) \cdot \frac{\rho(P, \lambda)}{L^2(P)} + I1(P, \lambda) \quad (1)$$

wherein α(P,λ) represents a coefficient linked to the characteristics of the light emitted by source LS at point P of the object (intensity, angle of incidence, wavelength λ, . . . ), the optical components arranged in front of sensor IS (transmission, opening), and sensor IS itself (pixel size, response at wavelength λ), ρ(P,λ) represents the reflectance of point P of object O at wavelength λ of the light emitted by source LS, L(P) represents the distance between source LS and point P of object O, and I1(P,λ) represents the intensity of a pixel corresponding to point P in image I1 at wavelength λ, that is to say an intensity component of the pixel due to reflection of the ambient light (in the absence of source LS) by point P of object O. Thus, the term corresponding to the reflection by point P of the light emitted by light source LS is on one hand inversely proportional to the square of distance L(P) between source LS and point P of the object, and on the other hand proportional to the reflectance of point P of object O at wavelength λ. In the lighting conditions of FIG. 1B, the luminous intensity supplied by light source LS at a point of the object depends on the distance between these latter.

In FIG. 1C, object O is arranged in the same position as in FIG. 1A, with respect to field F of image capture device IS. Object O is lit in a uniform manner by light source LS through a collimation device CL transmitting to the object a beam LB2 of parallel light rays. In these lighting conditions, device IS produces an image I3, in which the intensity I3(P,λ) at wavelength λ of a pixel corresponding to a point P of object O, may be simulated by the following equation:

$$I3(P,\lambda) = \beta(P,\lambda) \cdot \rho(P,\lambda) + I1(P,\lambda) \quad (2)$$

In this equation, β(P,λ) represents a coefficient linked to the characteristics of the light emitted by source LS at point P of the object (intensity, angle of incidence, wavelength λ, . . . ), the optic placed in front of the sensor (transmission, opening, . . . ), and the sensor itself (pixel size, response to the wavelength λ). Thus, the term corresponding to the reflection by point P of the light emitted by source LS is directly proportional to the reflectance of point P of object O at wavelength λ. In the lighting conditions of FIG. 1C, the luminous intensity received by a point of the object is constant or independent of the distance between light source LS and the point.

The combination of equations (1) and (2) allows the distance L(P) between source LS and point P at the surface of object O to be deduced in accordance with the following equation:

$$L(P) = \sqrt{\frac{\alpha(P,\lambda)}{\beta(P,\lambda)}} \cdot \sqrt{\frac{I3(P,\lambda) - I1(P,\lambda)}{I2(P,\lambda) - I1(P,\lambda)}} \quad (3)$$

If the ratio α/β is supposed to be constant over the entire image and if it is desired to simply evaluate the depths or the relative distances D to obtain a three-dimensional image of object O, relative depth D(P) of points P of object O in a three-dimensional image of this object may be obtained with the aid of the following equation:

$$D(P) = \sqrt{\frac{I3(P) - I1(P)}{I2(P) - I1(P)}} \quad (4)$$

wherein I1(P), I2(P), and I3(P) are the intensities of the pixel corresponding to point P of object O in images I1, I2, I3.

In the case where ambient light AL is relatively weak, the intensity I1(P) of each pixel of image I1 may be ignored. It results that equation (4) may be reduced to the following equation:

$$D(P) = \sqrt{\frac{I3(P)}{I2(P)}} \quad (5)$$

Moreover, if the ambient light AL present in the region including the object has a luminous intensity that is constant or independent of the distance, image I1 of object O lit by the ambient light thus has the same characteristics of image I3 (equation (2)). It is therefore not necessary to acquire the image I3. Equation (4) may therefore be simplified to the following equation:

$$D(P) = \sqrt{\frac{I1(P)}{I2(P) - I1(P)}} \qquad (6)$$

A luminous intensity that is constant or independent of the distance in a region may be obtained in particular with the aid of a parallel ray light beam (for example sunlight), or by a completely diffused lighting, that is to say from multiple sources and multiple directions.

It results that in accordance with equations (5) and (6) and in the application conditions of these equations, a three-dimensional image of object O may be obtained using only two images.

The lighting conditions corresponding to FIGS. 1B and 1C may be obtained by placing a variable focus lens in front of light source LS, and by controlling the lens to obtain, on output of the lens, either a divergent or a collimated (with parallel rays) light beam. Such a lens may be easily integrated in a device such as a portable computer or a mobile telephone, which are already equipped with an image sensor and frequently with a light source of one or more electroluminescent diodes or a laser, associated with the image sensor. In such devices, the reconstruction of a three-dimensional image may be done to perform a secure identification based on images of a face or of a fingerprint.

Equation (4) allows for good precision with a small number of operations (2 subtractions, 1 division and a square root). This equation (or one of equations (5) and (6)) may therefore be used to calculate in real-time a large number of pixels and thus allow for the reconstruction of a three-dimensional image having a high definition, with current calculation devices. The implementation of these equations is thus compatible with high resolution image sensors (several mega pixels) and with a processing in real time of a stream of video images to supply a three-dimensional image for all three images of the video stream. Indeed, it may be envisaged to produce a stream of video images comprising a succession of sequences of three images I1, I2, I3 respectively taken in the lighting conditions shown by FIGS. 1A, 1B, 1C. The first image I1 may be obtained by turning off light source LS. The second image I2 may be obtained by turning on source LS and by controlling a variable focus lens in front of the light source so that the emitted light beams are divergent. The third image may be obtained by keeping light source LS on and by controlling the lens in front of source LS so that the emitted beam is cylindrical. The rate of video images may be sufficiently rapid so that the captured scene remains essentially fixed in each sequence of three images I1, I2, I3. If the object is not fixed between the acquisitions of three images I1, I2, I3, a simple re-centering process of the acquired images may be done to coincide the scene or an object moving in the three images.

Figure 2:
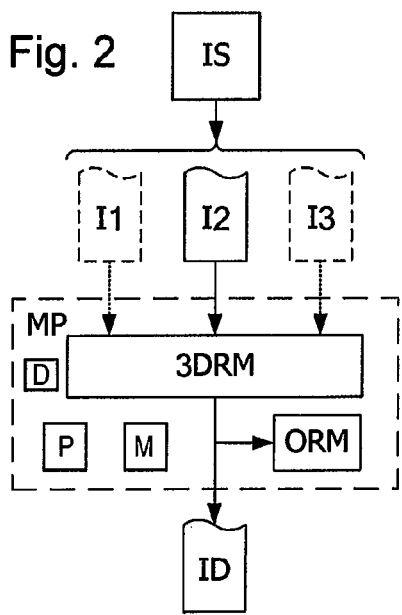

FIG. 2 shows an example of a three-dimensional image reconstruction device. The reconstruction device comprises a calculator MP, for example of the microprocessor or microcontroller type, which may be connected to image capture device IS. Device IS supplies image I2 and images I1 and/or I3 to calculator MP. Calculator MP comprises a three-dimensional image reconstruction module 3DRM for reconstruction of a three-dimensional image from images I1, I2, I3 supplied by image capture device IS. Module 3DRM produces a three-dimensional image ID that may be supplied to an exploitation module ORM of calculator MP, such as a shape recognition module.

The calculator MP also comprises one or more processors P, one or more memories M, and discrete circuitry D, which may comprise, for example, multipliers, adders, logic circuits, etc. The various functions of the calculator may be implemented in various ways, such as by the processor P and the memory M (for example by executing instructions stored in the memory M), the discrete circuit D, and various combinations thereof, etc.

Evidently, the three-dimensional image reconstruction device is not necessarily connected to an image capture device. Indeed, the acquired images allowing for the reconstruction of images in three dimensions may be transmitted to the calculator, for example in a differed manner, without such a connection being established.

Figure 3:
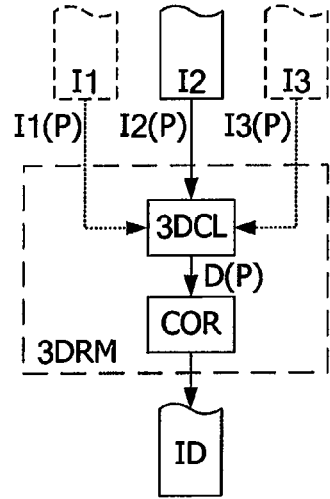

FIG. 3 shows an embodiment of module 3DRM adapted to the case where the images supplied by image capture device IS are monochromatic. In FIG. 3, module 3DRM comprises a combination module 3DCL to combine pixels I1(P), I2(P), I3(P) of each of images I1, I2, I3 introduced in module 3DRM. Module 3DCL produces a three-dimensional image D by implementing one of equations (4), (5), and (6). The produced three-dimensional image D may be supplied to a correction module COR allowing in particular for the reduction of artifacts susceptible of appearing in the three-dimensional image.

Figure 4:
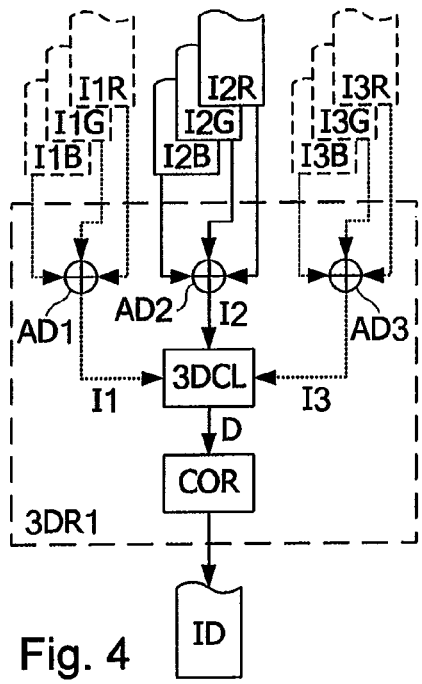
Figure 5:
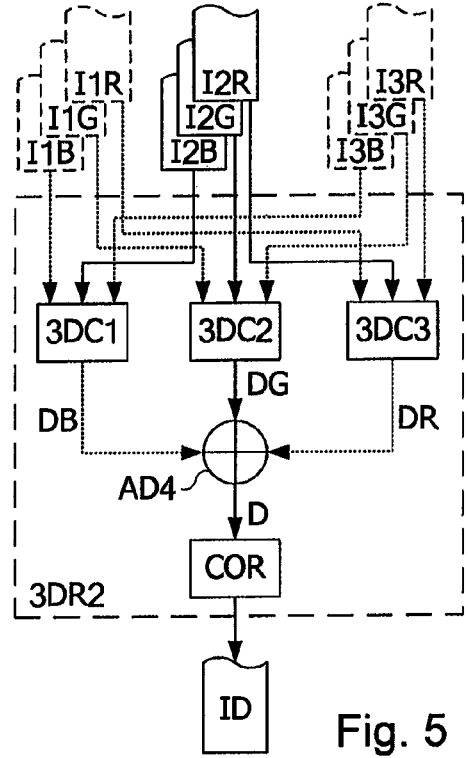

FIGS. 4 and 5 show embodiments of the three-dimensional image reconstruction module, adapted to the case where images I1, I2, I3 supplied by image capture device IS comprise several image components corresponding to different colors, for example two or three complementary colors (cyan, magenta, yellow) as well as the three primary colors (red, green, blue) to constitute a color image. For example, in the case where sensor IS supplies images according to the three primary colors red, green and blue, each of images I1, I2, I3 comprises an image component I1R, I1G, I1B, I2R, I2G, I2B, I3R, I3G, I3B in each of the three primary colors, red, green, and blue.

In FIG. 4, a three-dimensional image reconstruction module 3DR1 differs from module 3DRM in that it receives each of images I2 and I1 and/or I3 in the form of three image components I1R, I1G, I1B, I2R, I2G, I2B, I3R, I3G, I3B in the three primary colors, and comprises three supplementary adders AD1, AD2, AD3. Adders AD1, AD2, AD3 allow for the reconstitution of an image in grey scale from three image components in the three primary colors. Thus, adders AD1, AD2, AD3 apply to the three image components of each acquired image for example the following equation:

$$Ix(P)=0.2989\,IxR(P)+0.5870\,IxG(P)+0.1140\,IxB(P) \qquad (7)$$

with x equal to 1, 2, or 3.

Adder AD1 adds pixel-by-pixel the three image components I1R, I1G, I1B of image I1 by applying equation (7). Adders AD2, AD3 perform these same operations with image components I2R, I2G, I2B, I3R, I3G, I3B of images I2 and I3. Adders AD1, AD2, AD3 thus respectively supply a monochromatic image I1, I2, I3 to module 3DCL.

FIG. 5 represents a three-dimensional image reconstruction module 3DR2 that differs from module 3DRM in that combination module 3DCL is replaced by three combination modules 3DC1, 3DC2, 3DC3, and in that it comprises an adder AD4. Each module 3DC1, 3DC2, 3DC3 receives the image components of a same primary color of images I2 and I1 and/or I3, and may perform the same operations as module 3DCL on an image component, for example by implementing one of equations (4), (5), and (6). Modules 3DC1, 3DC2, 3DC3 respectively supply three dimensional images DR, DG, DB for a primary color, on the basis of red, green, and blue image components received. Adder AD4 combines these three-dimensional images, for example simply by averaging pixel-by-pixel images DR, DG and DB:

$$D(P) = \frac{DR(P) + DG(P) + DB(P)}{3} \quad (8)$$

Adder AD4 supplies a three-dimensional image D that may then be corrected by correction module COR.

It should be noted that in FIG. 5, a correction module may be provided on output of each of the combination modules 3DC1, 3DC2, 3DC3. Correction module COR on output of adder AD4 may be omitted.

Figure 6:
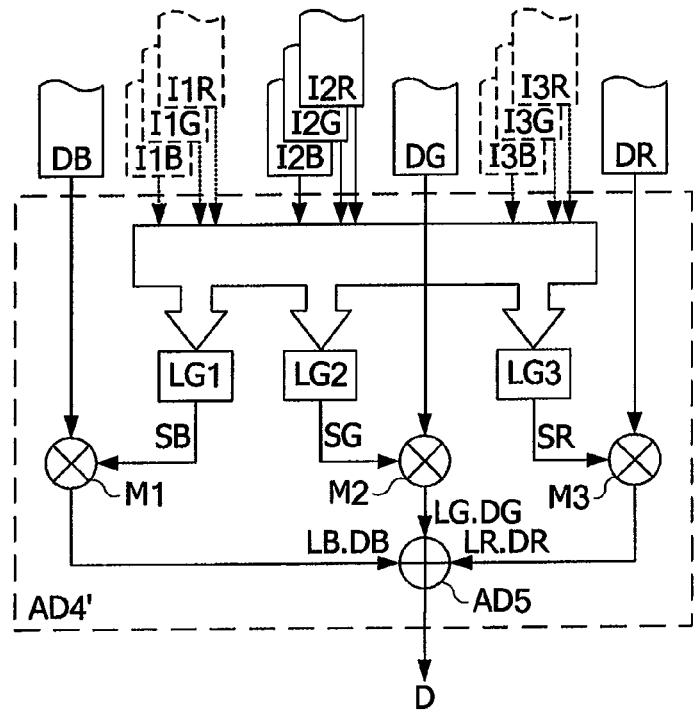

FIG. 6 shows an embodiment of adder AD4 of FIG. 5. In FIG. 6, adder AD4' performs a combination operation that is more complex than a simple average of three dimensional images DR, DG, DB generated for each of the image components. Adder AD4' receives all color components I1R, I1G, I1B, I2R, I2G, I2B, I3R, I3G, I3B of images I2 and I1 and/or I3, as well as the three dimensional images DR, DG, DB for each color component. Adder AD4' comprises three logic circuits LG1, LG2, LG3, an adder AD5, and three multipliers M1, M2, M3. Circuits LG1, LG2, LG3 receive the image components of acquired images and each supplies a pixel-by-pixel combination SB, SG, SR of these components. Multiplier M1 receives three-dimensional image DB and combination SB supplied by circuit LG1. Multiplier M2 receives three-dimensional image DG and combination SG supplied by circuit LG2. Multiplier M3 receives three-dimensional image DR and combination LR supplied by circuit LG3. The output of each of multipliers M1, M2, M3 is connected to a respective input of adder AD5. The output of adder AD5 supplies a three-dimensional image D. Thus, adder AD4' calculates each pixel D(P) of three-dimensional image D by applying to each pixel of acquired images I2 and I1 and/or I3, the following equation:

$$D(P) = SR(P) \cdot DR(P) + SG(P) \cdot DG(P) + SB(P) \cdot DB(P) \quad (9)$$

with SR(P)+SG(P)+SB(P)=1, wherein SR(P), SG(P) and SB(P) are the result of combinations of luminous intensities of the pixel in each of the primary colors red, green, and blue of acquired images I2 and I1 and/or I3, and DR(P), DG(P) and DB(P) are the calculated depths for the pixel in each of the primary colors, for example with the aid of one of equations (4), (5), and (6). Adder AD4' may thus calculate, for each pixel D(P) of three-dimensional image D, an arithmetic average of depths DR(P), DG(P), DB(P) calculated for each of the primary colors, weighted by the combinations SR(P), SG(P), SB(P).

In the case where equation (4) is applied to calculate images DR, DG and DB, combinations SR(P), SG(P), SB(P) may have the following values:

$$Sy(P) = \frac{I3y(P) - I1y(P)}{(I3R(P) + I3G(P) + I3B(P)) - (I1R(P) + I1G(P) + I1B(P))} \quad (10)$$

with y=R, G, and B.

In the case where equation (5) is applied to calculate images DR, DG, and DB, combinations SR(P), SG(P), SB(P) may have the following values:

$$Sy(P) = \frac{I3y(P)}{(I3R(P) + I3G(P)I3B(P))} \quad (11)$$

In the case where equation (6) is applied to calculate images DR, DG, and DB, combinations SR(P), SG(P), SB(P) may have the following values:

$$Sy(P) = \frac{I1y(P)}{(I1R(P) + I1G(P) + I1B(P))} \quad (12)$$

According to one embodiment, module 3DCL (or 3DC1, 3DC2, 3DC3) may, in certain conditions unfavorable for certain pixels, not implement equation (4), (5), or (6) and force the value of pixel D(P) to a threshold value, such as maximum value, or to a value indicating that the corresponding pixel was not determined. In the case where equation (4) is applied, these unfavorable conditions may be present, for example, when the difference I3(P)−I1(P) and/or the difference I2(P)−I1(P) is less than a certain threshold. In the case where equation (5) is applied, these unfavorable conditions may be present, for example, when value I3(P) and/or value I2(P) is less than a certain threshold. In the case where equation (6) is applied, these unfavorable conditions may be present, for example, when the difference I2(P)−I1(P) is less than a certain threshold. The detection thresholds of unfavorable conditions may be determined by statistical calculations. In this manner, the noise susceptible of appearing in the dark image zones is removed.

Correction module COR may implement spatial filtering techniques, in example, to reduce the high-frequency noise susceptible of appearing in the reconstructed images. Module COR may also implement techniques based on adaptive filtering.

It turns out however that artifacts may appear during the reconstruction of a three-dimensional image D of an object. Indeed, the decrease of $1/L^2$ used to simulate the lighting of an object in equation (1) is not completely correct due to several factors not taken into account in this first approximation. A first factor results from the fact that the optical axis X of image capture device IS is not necessarily aligned with that Y of light beams LB1, LB2 emitted by source LS. A second factor results from the fact that light source LS may not have a perfectly square emission form, but rather of the Gaussian type. Moreover, ambient light AL during the acquisition of image I1 and in the case of the implementation of equation (5) may not have exactly parallel rays, in particular due to shadows formed by objects that are and are not present in the scene in the field of the image capture device. Moreover, module COR may be configured to detect partially or completely the presence of shadows in the scene and to remove their effects.

To simulate more precisely the lighting of an object in the lighting conditions of FIG. 1B, 1/Pn(L) may be used, Pn being an n-degree polynomial. Equations (4), (5), and (6) may therefore be used to calculate a corrected depth D'(P) equal to Pn'(D(P)), Pn' being an n-degree polynomial. The degree of polynomial Pn' may be chosen to be equal to two, three, or more if necessary, to obtain a greater precision. The coefficients of the polynomial may be determined by a calibration.

It will be understood by the skilled person that embodiments of the present disclosure are susceptible of diverse implementation variations and applications. In particular, the disclosure is not limited to the reconstruction of a three-dimensional image comprising as many pixels as the acquired images. Indeed, the three-dimensional image may have a lower definition and thus comprise fewer pixels than the acquired images (under spatial sampling).

Moreover, the disclosure is also not limited to the types of lighting described in reference to FIGS. 1A, 1B, and 1C. Indeed, the reconstruction of a three-dimensional image may be done as soon as an image of an object with a lighting dependant on the distance between the light source lighting the object and the object and of an image of the object under a lighting independent of this distance are obtained.

Other equations derived from the previously mentioned equations may be implemented to evaluate the pixels of the three-dimensional image to reconstruct. The disclosure is therefore not limited to the implementation of equations (4) to (6).

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, state machines, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners. The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
acquiring a first image of an object lit by a luminous flux having, in a region including the object, a luminous intensity dependent on a distance of a light source emitting the luminous flux;
acquiring a second image of the object lit by a luminous flux having, in a region including the object, a constant luminous intensity; and
determining for pixels of a set of pixels of a three-dimensional image, a relative distance of a point of the object as a function of an intensity of a pixel corresponding to the point of the object in the first and second acquired images, wherein the relative distance of each pixel of the set of pixels of the three-dimensional image is determined based on the following equation:

$$D(P) = \sqrt{\frac{I3(P)}{I2(P)}}$$

wherein D(P) represents a pixel of the three-dimensional image, corresponding to a point P of the object, and I2(P) and I3(P) represent the intensity of the pixel corresponding to the point P of the object, respectively in the first and second images.

2. The method of claim 1 wherein the object is lit by the same light source producing a divergent light beam during the acquisition of the first image, and a collimated beam during the acquisition of the second image.

3. A method, comprising:
acquiring a first image of an object lit by a luminous flux having, in a region including the object, a luminous intensity dependent on a distance of a light source emitting the luminous flux;
acquiring a second image of the object lit by a luminous flux having, in a region including the object, a constant luminous intensity;
acquiring a third image of the object lit by ambient light; and
determining for pixels of a set of pixels of a three-dimensional image, a relative distance of a point of the object as a function of an intensity of a pixel corresponding to the point of the object in the first, second and third acquired images, wherein the relative distance of each pixel of the set of pixels of the three-dimensional image is determined based on the following equation:

$$D(P) = \sqrt{\frac{I3(P) - I1(P)}{I2(P) - I1(P)}}$$

wherein D(P) represents a pixel of the three-dimensional image corresponding to a point P of the object, and I1(P), I2(P), and I3(P) represent the intensity of the pixel corresponding to the point P of the object, respectively in the third, first and second images.

4. The method of claim 1 wherein the object is lit by the light source producing a divergent light beam during the acquisition of the first image, and lit by an ambient light with parallel or completely diffused rays during the acquisition of the second image.

5. A method, comprising:
acquiring a first image of an object lit by a luminous flux having, in a region including the object, a luminous intensity dependent on a distance of a light source emitting the luminous flux;
acquiring a second image of the object lit by a luminous flux having, in a region including the object, a constant luminous intensity; and
determining for pixels of a set of pixels of a three-dimensional image, a relative distance of a point of the object as a function of an intensity of a pixel corresponding to the point of the object in the first and second acquired images, wherein the relative distance of each pixel of the set of pixels of the three-dimensional image is determined based on the following equation:

$$D(P) = \sqrt{\frac{I1(P)}{I2(P) - I1(P)}}$$

wherein D(P) represents a pixel of the three-dimensional image, corresponding to a point P of the object, and I1(P) and I2(P) represent the intensity of the pixel corresponding to the point P of the object, respectively in the second and first images.

6. The method of claim 1 wherein the acquired images are in color and comprise an image component for each of several complementary colors, the method comprising calculating the intensity of pixels of an image by adding pixel-by-pixel the image components of each complementary color of the image.

7. The method of claim 1 wherein the acquired images are in color and comprise an image component for each of several complementary colors, and the determining comprises:
  for each complimentary color, determining the relative distance as a function of the intensity of a corresponding pixel of the complementary color in each acquired image, producing an image in three dimensions in the complementary color; and
  combining the produced images in three dimensions to produce the three-dimensional image.

8. The method of claim 7 wherein combining the produced images in three dimensions comprises:
  for each pixel in each produced image in three dimensions, determining a weighting factor for the pixel; and
  applying the weighting factor to the pixel; and
  adding the weighted pixels of the produced images in three dimensions.

9. The method of claim 7 wherein combining the produced images in three dimensions comprises:
  calculating, for each pixel and each complementary color, sums of luminous intensities of corresponding pixels in each of the image components of the complementary color, of acquired images; and
  calculating an average for each pixel of the three-dimensional image, of each corresponding pixel of three-dimensional images determined for each complementary color component, weighted by the calculated sums.

10. The method of claim 1, comprising correcting a value of each pixel of the three-dimensional image by applying to the value of the pixel an n-degree polynomial having calibration coefficients.

11. The method of claim 10 wherein the polynomial is of degree 2 or 3.

12. A non-transitory computer-readable medium whose contents cause an image processing device to perform a method, the method comprising:
  acquiring a first image of an object lit by a luminous flux having, in a region including the object, a luminous intensity dependent on a distance of a light source emitting the luminous flux;
  acquiring a second image of the object lit by a luminous flux having, in a region including the object, a constant luminous intensity; and
  determining for pixels of a set of pixels of a three-dimensional image, a relative distance of a point of the object as a function of an intensity of a pixel corresponding to the point of the object in the first and second acquired images, wherein the relative distance of each pixel of the set of pixels of the three-dimensional image is determined based on the following equation:

$$D(P) = \sqrt{\frac{I3(P)}{I2(P)}}$$

wherein D(P) represents a pixel of the three-dimensional image, corresponding to a point P of the object, and I2(P) and I3(P) represent the intensity of the pixel corresponding to the point P of the object, respectively in the first and second images.

13. The medium of claim 12 wherein the method further comprises controlling the light source to produce a divergent light beam during the acquisition of the first image, and a collimated beam during the acquisition of the second image.

14. The medium of claim 12 wherein the acquired images are in color and comprise an image component for each of several complementary colors, the method comprising calculating the intensity of pixels of an image by adding pixel-by-pixel the image components of each complementary color of the image.

15. The medium of claim 12 wherein the acquired images are in color and comprise an image component for each of several complementary colors, and the determining comprises:
  for each complimentary color, determining the relative distance as a function of the intensity of a corresponding pixel of the complementary color in each acquired image, producing an image in three dimensions in the complementary color; and
  combining the produced images in three dimensions to produce the three-dimensional image.

16. The medium of claim 15 wherein combining the produced images in three dimensions comprises:
  for each pixel in each produced image in three dimensions, determining a weighting factor for the pixel; and
  applying the weighting factor to the pixel; and
  adding the weighted pixels of the produced images in three dimensions.

17. The medium of claim 12 wherein the method comprises correcting a value of each pixel of the three-dimensional image.

18. An image processing device, comprising:
  one or more input nodes configured to receive:
    a first image of an object lit by a luminous flux having, in a region including the object, a luminous intensity dependent on a distance of a light source emitting the luminous flux; and
    a second image of the object lit by a luminous flux having, in a region including the object, a constant luminous intensity; and
  a three-dimensional image reconstructor coupled to the one or more input nodes and configured to determine for pixels of a set of pixels of a three-dimensional image, a relative distance of a point of the object as a function of an intensity of a pixel corresponding to the point of the object in the first and second images, wherein the three-dimensional image reconstructor is configured to determine the relative distance of each pixel of the set of pixels of the three-dimensional image based on the following equation:

$$D(P) = \sqrt{\frac{I3(P)}{I2(P)}}$$

wherein D(P) represents a pixel of the three-dimensional image, corresponding to a point P of the object, and I2(P) and I3(P) represent the intensity of the pixel corresponding to the point P of the object, respectively in the first and second images.

19. The device of claim 18, further comprising:
an image sensor coupled to the one or more input nodes and configured to capture the first and second images; and
the light source, the light source having a lens, wherein the device is configured to control the lens to form a divergent light beam during capture of the first image by the image sensor and to form a collimated light beam during capture of the second image by the image sensor.

20. An image processing device, comprising:
one or more input nodes configured to receive:
 a first image of an object lit by a luminous flux having, in a region including the object, a luminous intensity dependent on a distance of a light source emitting the luminous flux;
 a second image of the object lit by a luminous flux having, in a region including the object, a constant luminous intensity; and
 a third image of the object lit by an ambient light; and
a three-dimensional image reconstructor coupled to the one or more input nodes and configured to determine for pixels of a set of pixels of a three-dimensional image, a relative distance of a point of the object as a function of an intensity of a pixel corresponding to the point of the object in the first, second and third images, wherein the relative distance of each pixel of the set of pixels of the three-dimensional image is determined based on the following equation:

$$D(P) = \frac{I3(P) - I1(P)}{I2(P) - I1(P)}$$

wherein D(P) represents a pixel of the three-dimensional image corresponding to a point P of the object, and I1(P), I2(P), and I3(P) represent the intensity of the pixel corresponding to the point P of the object, respectively in the third, first and second images.

21. The device of claim 19 wherein the image sensor is configured to capture color images and the three-dimensional image reconstructor is configured to process color images.

22. A system, comprising:
means for receiving,
 a first image of an object lit by a luminous flux having, in a region including the object, a luminous intensity dependent on a distance of a light source emitting the luminous flux; and
 a second image of the object lit by a luminous flux having, in a region including the object, a constant luminous intensity; and
means for determining, for pixels of a set of pixels of a three-dimensional image, a relative distance of a point of the object as a function of an intensity of a pixel corresponding to the point of the object in the first and second images, wherein the relative distance of each pixel of the set of pixels of the three-dimensional image is determined based on the following equation:

$$D(P) = \sqrt{\frac{I3(P) - I1(P)}{I2(P) - I1(P)}}$$

wherein D(P) represents a pixel of the three-dimensional image, corresponding to a point P of the object, and I2(P) and I3(P) represent the intensity of the pixel corresponding to the point P of the object, respectively in the first and second images.

23. The system of claim 22 wherein the means for determining comprises a three-dimensional image construction module configured to construct a three dimensional image from at least the first and second images.

24. The system of claim 22 wherein the means for determining comprises a shape recognition module and a correction module.

25. The system of claim 22 wherein the means for determining comprises at least one adder and a plurality of multipliers.

26. The method of claim 3 wherein the acquired images are in color and comprise an image component for each of several complementary colors, and the determining comprises:
 for each complimentary color, determining the relative distance as a function of the intensity of a corresponding pixel of the complementary color in each acquired image, producing an image in three dimensions in the complementary color; and
 combining the produced images in three dimensions to produce the three-dimensional image.

27. The method of claim 26 wherein combining the produced images in three dimensions comprises:
 for each pixel in each produced image in three dimensions, determining a weighting factor for the pixel; and
 applying the weighting factor to the pixel; and
 adding the weighted pixels of the produced images in three dimensions.

28. The method of claim 5 wherein the acquired images are in color and comprise an image component for each of several complementary colors, and the determining comprises:
 for each complimentary color, determining the relative distance as a function of the intensity of a corresponding pixel of the complementary color in each acquired image, producing an image in three dimensions in the complementary color; and
 combining the produced images in three dimensions to produce the three-dimensional image.

29. The method of claim 28 wherein combining the produced images in three dimensions comprises:
 for each pixel in each produced image in three dimensions, determining a weighting factor for the pixel; and
 applying the weighting factor to the pixel; and
 adding the weighted pixels of the produced images in three dimensions.

30. The device of claim 20 wherein the image sensor is configured to capture color images and the three-dimensional image reconstructor is configured to process color images.

* * * * *

UNITED STATES PATENT AND TRADEMARK OFFICE
CERTIFICATE OF CORRECTION

PATENT NO. : 8,878,903 B2
APPLICATION NO. : 13/273057
DATED : November 4, 2014
INVENTOR(S) : Cédric Tubert et al.

It is certified that error appears in the above-identified patent and that said Letters Patent is hereby corrected as shown below:

On the title page

Item (73):
"STMicroelectronics (Grenoble) SAS, Grenoble (FR)" should read, -- STMicroelectronics (Grenoble 2) SAS, Grenoble (FR) --.

In the claims

Column 14, Line 7:
" $D(P) = \sqrt{\dfrac{I3(P)}{I2(P)}}$ " should read, -- $D(P) = \sqrt{\dfrac{I3(P)}{I2(P)}}$ --.

Column 14, Line 40:
" $D(P) = \sqrt{\dfrac{I3(P) - I1(P)}{I2(P) - I1(P)}}$ " should read, -- $D(P) = \sqrt{\dfrac{I3(P) - I1(P)}{I2(P) - I1(P)}}$ --.

Column 15, Line 1:
" $D(P) = \sqrt{\dfrac{I1(P)}{I2(P) - I1(P)}}$ " should read, -- $D(P) = \sqrt{\dfrac{I1(P)}{I2(P) - I1(P)}}$ --.

Column 16, Line 1:
" $D(P) = \sqrt{\dfrac{I3(P)}{I2(P)}}$ " should read, -- $D(P) = \sqrt{\dfrac{I3(P)}{I2(P)}}$ --.

Signed and Sealed this
Seventeenth Day of November, 2015

Michelle K. Lee
*Director of the United States Patent and Trademark Office*

CERTIFICATE OF CORRECTION (continued)
U.S. Pat. No. 8,878,903 B2

In the claims

Column 16, Line 65:

" $D(P) = \sqrt{\dfrac{I3(P)}{I2(P)}}$ " should read, -- $D(P) = \sqrt{\dfrac{I3(P)}{I2(P)}}$ --.

Column 17, Line 35:

" $D(P) = \dfrac{I3(P) - I1(P)}{I2(P) - I1(P)}$ " should read, -- $D(P) = \sqrt{\dfrac{I3(P) - I1(P)}{I2(P) - I1(P)}}$ --.

Column 18, Line 5:

" $D(P) = \sqrt{\dfrac{I3(P) - I1(P)}{I2(P) - I1(P)}}$ " should read, -- $D(P) = \sqrt{\dfrac{I3(P)}{I2(P)}}$ --.